(12) United States Patent
Miyata (10) Patent No.: US 8,610,906 B2
(45) Date of Patent: Dec. 17, 2013

(54) PRINT CONTROL SYSTEM, AND PRINTER AND COMPUTER READABLE MEDIUM THEREFOR

(75) Inventor: Yuji Miyata, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 990 days.

(21) Appl. No.: 12/022,406

(22) Filed: Jan. 30, 2008

(65) Prior Publication Data
US 2008/0180716 A1 Jul. 31, 2008

(30) Foreign Application Priority Data
Jan. 30, 2007 (JP) ................... 2007-019630

(51) Int. Cl.
*G06F 3/12* (2006.01)
(52) U.S. Cl.
USPC ........................................ 358/1.13; 358/1.15
(58) Field of Classification Search
USPC ...................... 358/1.13, 1.15, 1.14
See application file for complete search history.

(56) References Cited

U.S. PATENT DOCUMENTS

| | | | | |
|---|---|---|---|---|
| 5,459,556 A * | 10/1995 | Acquaviva et al. | ............. | 399/58 |
| 6,628,904 B2 * | 9/2003 | Yamada | ............. | 399/27 |
| 6,915,090 B2 * | 7/2005 | Fukaya | ............. | 399/85 |
| 7,965,410 B2 * | 6/2011 | Lin et al. | ............. | 358/1.4 |
| 2005/0018230 A1 * | 1/2005 | Green et al. | ............. | 358/1.13 |
| 2005/0111028 A1 | 5/2005 | Kim | | |
| 2006/0290974 A1 | 12/2006 | Kano et al. | | |
| 2007/0070377 A1 * | 3/2007 | Hirabayashi | ............. | 358/1.13 |

FOREIGN PATENT DOCUMENTS

| | | |
|---|---|---|
| EP | 1 341 076 A2 | 9/2003 |
| JP | 05-077489 | 3/1993 |
| JP | 09-018641 | 1/1997 |
| JP | 10-211751 | 8/1998 |
| JP | 11-151837 | 6/1999 |
| JP | 2000-108328 | 4/2000 |
| JP | 2001-255785 | 9/2001 |
| JP | 2002-283670 | 10/2002 |
| JP | 2003-025636 | 1/2003 |
| JP | 2003-167705 | 6/2003 |
| JP | 2003-175590 | 6/2003 |
| JP | 2006-123428 | 5/2006 |
| JP | 2006-231526 | 9/2006 |
| JP | 2006-268441 | 10/2006 |
| JP | 2007-006020 | 1/2007 |
| JP | 2007-015128 | 1/2007 |
| WO | 2004-092943 | 10/2004 |

OTHER PUBLICATIONS

Notice of Reasons of Rejection, Japanese Application No. 2007-019630, Reference No. PBRO3118, Mailing Date Dec. 9, 2008.

(Continued)

*Primary Examiner* — Benny Q Tieu
*Assistant Examiner* — Sunil Chacko
(74) *Attorney, Agent, or Firm* — Banner & Witcoff, Ltd.

(57) ABSTRACT

A print control system includes a computer configured to perform data processing, a printer, which is connected with the computer, configured to execute a print job transmitted by the computer so as to print an image on a recording medium, a print control unit configured to control the printer to execute the print job based on print settings, and a setting change unit configured to accept a setting change of the print settings regarding the print job in execution and update the print settings based on the accepted setting change while the print job is being executed. When the setting change unit updates the print settings, the print control unit controls the printer to execute the print job based on the updated print settings.

12 Claims, 9 Drawing Sheets

(56) References Cited

OTHER PUBLICATIONS

Decision of Rejection mailed in JP counterpart application No. 2007-019630 dated Mar. 10, 2009 with English translation.

Search Report for corresponding European Application 08001225.5-1245, mailed Jul. 7, 2010.

Office Action issued in the European counterpart Application No. 08 001 225.5 dated Sep. 10, 2012.

* cited by examiner

FIG. 9 though a printing mode from a plurality of kinds of printing modes such as a high-quality image printing mode for performing high-definition image printing and a fast printing mode in which a higher priority is put on a fast print processing speed, a printing operation is performed in the selected mode.
PRINT CONTROL SYSTEM, AND PRINTER AND COMPUTER READABLE MEDIUM THEREFOR

CROSS-REFERENCE TO RELATED APPLICATION

This application claims priority under 35 U.S.C. §119 from Japanese Patent Application No. 2007-019630 filed on Jan. 30, 2007. The entire subject matter of the application is incorporated herein by reference.

BACKGROUND

1. Technical Field

The following description relates to one or more print control systems, and printers and computer readable media therefor.

2. Related Art

For example, Japanese Patent Provisional Publication No. 2001-255785 (hereinafter, referred to as '785 Publication) discloses a printer configured such that, after a user selects a printing mode from a plurality of kinds of printing modes such as a high-quality image printing mode for performing high-definition image printing and a fast printing mode in which a higher priority is put on a fast print processing speed, a printing operation is performed in the selected mode.

SUMMARY

However, there is the following problem in the printer disclosed in '785 Publication. After the user selects either of the printing modes, the printing operation is performed in the selected mode. After the printing operation is once started, until the printing operation is completed or forcibly terminated on the way, the user cannot change the printing mode to a mode other than the currently-selected mode.

Therefore, in the printer disclosed in '785 Publication, for example, in the case where the user wrongly selects the fast printing mode instead of the high-quality image printing mode which the user actually desires, after the printing operation is once started in the fast mode, as long as the printing operation is completed or forcibly terminated on the way, the user cannot change the printing mode from the fast printing mode to the high-quality image printing mode. Accordingly, the printer disclosed in '785 Publication is not necessarily regarded as a user-friendly printer.

Aspects of the present invention are advantageous in that there can be provided one or more improved print control systems, and printers and computer readable media therefor that can make the printer more user-friendly and convenient.

According to aspects of the present invention, there is provided a print control system, which includes a computer configured to perform data processing, a printer, which is connected with the computer, configured to execute a print job transmitted by the computer so as to print an image on a recording medium, a print control unit configured to control the printer to execute the print job based on print settings, and a setting change unit configured to accept a setting change of the print settings regarding the print job in execution and update the print settings based on the accepted setting change while the print job is being executed. When the setting change unit updates the print settings, the print control unit controls the printer to execute the print job based on the updated print settings.

According to another aspect of the present invention, there is provided a printer configured to be connectable with a computer and to execute a print job transmitted by the computer to print an image on a recording medium, the printer including a print control unit configured to control the printer to execute the print job based on print settings, and a setting change unit configured to accept a setting change of the print settings regarding the print job in execution and update the print settings based on the accepted setting change while the print job is being executed. When the setting change unit updates the print settings, the print control unit controls the printer to execute the print job based on the updated print settings.

According to a further aspect of the present invention, there is provided a computer readable medium having computer readable instructions stored thereon, which cause a computer connectable with an external printing device that executes a print job transmitted by the computer to print an image on a recording medium to perform steps of controlling the external printing device to execute the print job based on print settings, accepting a setting change of the print settings regarding the print job in execution, updating the print settings based on the accepted setting change while the print job is being executed, and controlling the external printing device to execute the print job based on the updated print settings.

In some aspects of the present invention, even though a print command is issued and the print job is being executed, the print settings can be updated on the way of a printing operation in execution. Therefore, the printer can be made more user-friendly and convenient.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, embodiments according to aspects of the invention will be described with reference to the accompanying drawings.

(First Embodiment)

1. Overview of Print Control System

Figure 1:
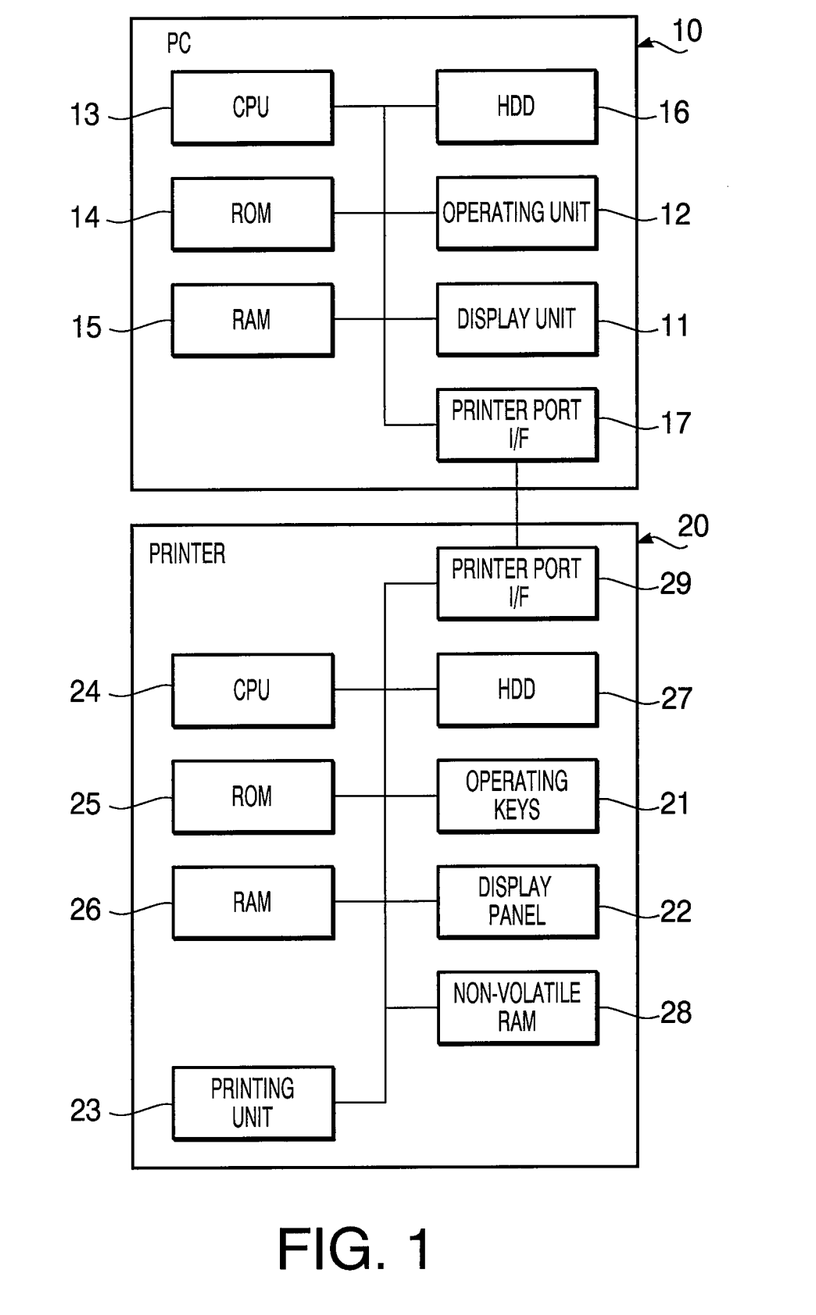
FIG. 1 schematically shows a print control system according to one or more aspects of the present invention.

FIG. 1 schematically shows a print control system according to aspects of the present invention, which is configured with a computer 10 and printer 20. Hereinafter, based on FIG. 1, the print control system according to aspects of the invention will be explained.

A computer 10 (hereinafter, referred to as "PC 10") is an information processing device configured with a display unit 11, operating unit 12, CPU 13, storing units such as a ROM 14, RAM 15, and HDD 16, and printer port interface 17 via which the PC 10 is connected with the printer 20. The display unit 11 is configured with an LCD or CRT that displays images and/or characters thereon. The operating unit 12 is configured with a pointing device such as a mouse (not shown) that moves a pointer (not shown) indicating a specific position on the display unit 11 and a keyboard (not shown).

In addition, the printer 20 is configured with operating keys 21 for selecting functions to be provided to the printer 20, a display panel 22 that displays a kind and/or working status of a currently-implemented operation, a printing unit 23 that prints characters and/or images on a recording medium such as a printing paper, CPU 24, ROM 25, RAM 26, and HDD 27.

Incidentally, the RAM 28 is a non-volatile memory that can hold recorded data thereon even though electric power supply is blocked. In addition, the printer port interface 29 can directly connect the printer 20 to the PC 10 without connecting them via LAN.

Additionally, the printer 20 (printing unit 23) according to aspects of the invention is a color-electrophotography-type image forming device (color laser printer) configured to form a colored image by transferring a plurality of kinds of toners such as Cyan (C), Magenta (M), Yellow (Y), and Black (B) onto the recording medium.

2. Operation of Print Control Program (Print Control System)

A print control program (printer driver) according to aspects of the invention controls the print control system with being installed in the PC 10. In the present embodiment, Windows (trademark registered) is employed as an OS (Operating System) of the PC 10. Hereinafter, terms not specifically defined will be used as general meanings in Windows.

Figure 2:
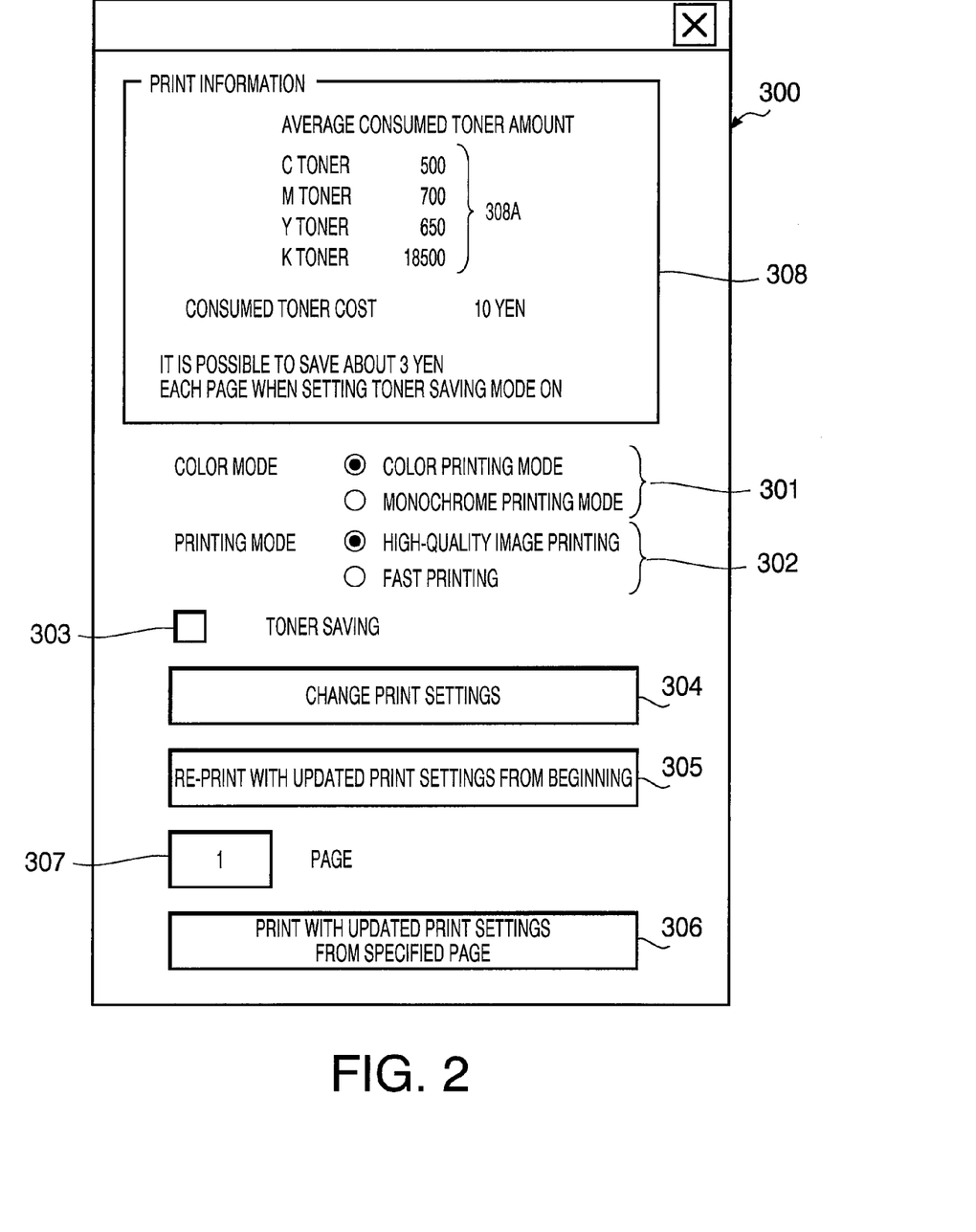
FIG. 2 is an example of a print setting screen in a first embodiment according to one or more aspects of the present invention.
Figure 3:
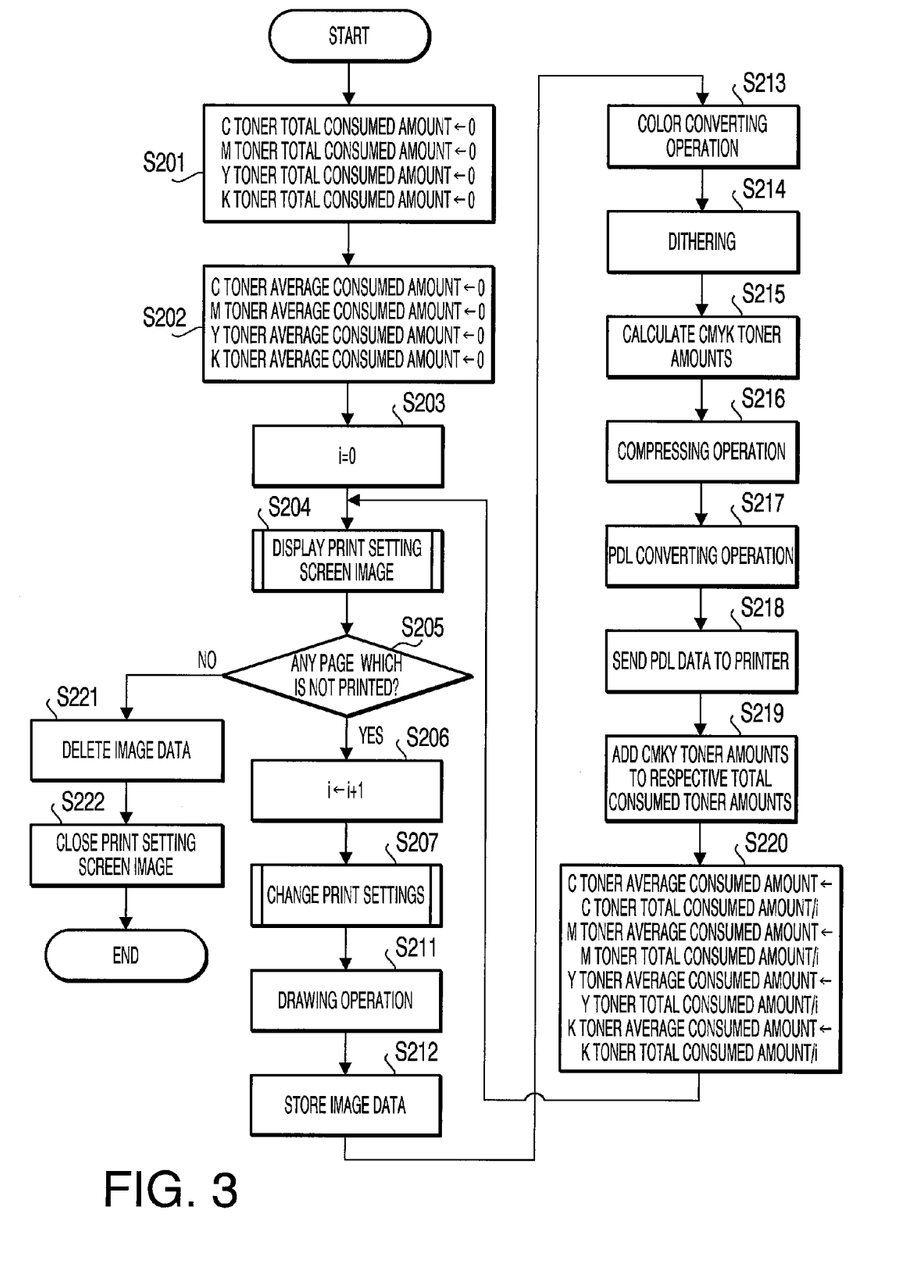
FIG. 3 is a flowchart showing a main control process in embodiments according to one or more aspects of the present invention.

FIG. 2 is an example of a print setting screen 300 displayed on the display unit 11 while a control process (hereinafter, referred to as "main control process") as features of a print control program according to aspects of the invention is being run. FIG. 3 is a flowchart showing a procedure of the main control process.

2.1. Print Setting Screen Image (See FIG. 2)

The print setting screen 300 keeps being displayed until a print job is completed after a printing command is issued to the printer 20 via application software such as a word processor.

In the print setting screen 300, there are displayed first to third setting change buttons 304 to 306 for accepting a change in the print settings for an active print job and performing a print job based on print settings updated with the accepted change.

It is noted that the change in the print settings is accepted with the user's operation of moving the pointer with the pointing device such as the mouse and selecting (clicking) an intended setting change button 304 or check box 301.

First check boxes 301 are means for accepting a selection regarding in which mode the print job is to be performed between a color printing mode and a monochrome printing mode. Second check boxes 302 are means for accepting a selection regarding in which mode the print job is to be performed between a high-quality image printing mode and a fast printing mode.

It is noted that the fast printing mode is a mode in which a higher priority is put on a processing speed for the print job (hereinafter, simply referred to as "processing mode") rather than the quality of a printed image. The high-quality image printing mode is a mode in which a higher priority is put on the quality of the printed image rather than the processing speed.

Therefore, in the present embodiment, a processing speed in the high-quality image printing mode is lower than that in the fast printing mode. In other words, a processing speed in the fast printing mode is higher than that in the high-quality image printing mode.

In addition, a data amount of printed objects in the color printing mode is larger than that in the monochrome printing mode. Hence, a processing speed in the color printing mode is lower than that in the monochrome printing mode, while a processing speed in the monochrome printing mode is higher than that in the color printing mode.

The processing speed represents a processing speed for performing a computing process (steps S212 to S217 in FIG. 3) for creating data dedicated to printing (e.g., PDL data) that are acceptable by the printer 20 based on printed object data created by the application software. For this reason, as the processing speed is higher, a time period for creating the data dedicated to printing is shorter.

The third check box 303 is a means for accepting a selection of whether to implement the print job in a toner saving mode in which an amount of a toner to be used in the printing operation is more saved than usual. When the third check box 303 is selected and set ON, the print job is carried out with the toner being less consumed than an OFF state.

In a state where any of the first to third check boxes 301 to 303 is selected by the user, when any of first to third setting change buttons 304 to 306 is selected by the user, the print job is performed based on print settings updated in response to the selected setting change button.

Specifically, the first setting change button 304 is a means for implementing the print job with the updated print settings from a next page to a page being printed when the first setting change button 304 is selected, that is, the changes of the print settings is accepted. The second setting change button 305 is a means for re-executing the print job in execution from the beginning.

The third setting change button 306 is a means for implementing the print job with the updated print settings from a page number inputted in a page input portion 307. The page input portion 307 is a means for accepting a setting of a page number to which the updated print settings are applied.

It is noted that, in the page input portion 307 according to aspects of the invention, a page number "1" is inputted as a default. Therefore, when the third setting change button 306 is selected without anew inputting a page number into the page input portion 307, the print job in execution is re-executed from the beginning (first page).

In addition, the first and third setting change buttons 304 and 306 is always displayed in an active state where the buttons 304 and 306 are selectable while the print setting screen 300 is being displayed. On the contrary, the second setting change button 305 is displayed in an active state where the button 305 is selectable in at least one of a case where the color mode is changed from the monochrome printing mode to the color printing mode, a case where the toner saving mode is changed from the ON state from the OFF state, and a case where the printing mode is changed from the fast printing mode to the high-quality image printing mode.

Namely, in the present embodiment, the first and third setting change buttons 304 and 306 are always selectable, while it is not until there is made such a change that the printing quality is improved that the second setting change button 305 is selectable.

Further, on the print setting screen 300, there are displayed print information 308 that includes parameters 308A representing average consumed amounts of the respective toners of Cyan (C), Magenta (M), Yellow (Y), and Black (K), and information 308B related to an amount of the toner consumed from a moment when the print job has been begun.

It is noted that each of the parameters 308A representing the average consumed amounts of the respective toners gives a greater value for a larger consumed amount. There is displayed beneath the parameters 308A, an average consumed toner cost for each page that is calculated based on the average consumed amounts of the respective toners.

The information 308B according to aspects of the invention a message regarding an amount of a saved cost that is displayed when the toner saving mode is in the OFF state. The information 308B contains a specific money amount of a savable average consumed toner cost in the toner saving mode with respect to a current average consumed toner cost.

2.2. Main Control Process (See FIG. 3)

The main control process is executed by the CPU 13 of the PC 10 when the printing command is issued to the printer 20 via the application software, that is, when a print button (not shown) of the application software or "Print" of a file menu is selected.

When the main control process is started up, as shown in FIG. 3, firstly, an initial value (in the present embodiment, "0") is inputted into the parameter representing the total consumed amount of each toner (S201). Then, an initial value (in the present embodiment, "0") is inputted into each of the parameters 308A (see FIG. 2) that represents an average consumed amount of each toner (S202). Thereafter, an initial value (0) is inputted into a parameter i representing a print page number (S203).

It is noted that, in the present embodiment, the total consumed amount parameter and average consumed amount parameter of each toner and the parameter i are stored in the RAM 15 of the PC 10. Next, the print setting screen 300 is displayed on the display unit 11 (S204), and then it is judged whether there is any page for which the printing operation is not completed in the print job executed based on the issued printing command (S205). It is noted that, in S204, a subroutine (see FIG. 4) for displaying a below-mentioned print setting screen 300 is performed. When the parameter i is "0", a fresh print setting screen 300 is displayed. When the parameter i is equal to or more than "1," the print setting screen 300 is displayed with updated contents displayed thereon.

When it is judged that there is no page for which the printing operation is not completed, namely, when the print job is completed (S205: No), image data stored in the RAM 15 are deleted (S221), and thereafter the print setting screen 300 is closed (S222), terminating the main control process.

Meanwhile, when it is judged that there is a page for which the printing operation is not completed (S205: Yes), the parameter i is incremented by one (S206), and thereafter the print settings of the printer 20 are updated with the settings accepted on the print setting screen 300 (S207). Incidentally, at this time, supposing that the print settings accepted on the print setting screen 300 are the same as those previously accepted, the print settings will be configured again with the same settings as accepted. It is noted that details about S207 will be described later.

Next, a drawing operation is performed in accordance with a drawing command for controlling a Graphic Device Interface (GDI) of an OS to create image data (S211). Then, the created image data are stored in the RAM 15 (S212).

In the present embodiment, since the image data are created based on an RGB format, when the print settings are set in the color printing mode, the RGB format image data are color-converted into CMYK format data. Meanwhile, when the print settings are set in the monochrome printing mode, the RGB format image data are color-converted to be drawn only with Black (K) (S213). It is noted that, when the toner saving mode is set ON, the RGB format image data are color-converted such that a further consumed amount of each toner is saved.

Subsequently, the color-converted data are dithered (S214), and then an amount of each toner to be consumed is calculated (S215). Here, the dithering means that the data are converted into points (1) to which the toner is to be transferred and points (0) to which the toner is not to be transferred. In the present embodiment, the consumed amount of the toner is calculated by counting the number of the points to which the toner is to be transferred.

Incidentally, a color, which is formed with a higher density of the points to which the toner is to be transferred, is darker. Meanwhile, a color, which is formed with a lower density of the points to which the toner is to be transferred, is lighter. Therefore, the density of the points to which the toner is transferred in the case where the toner saving mode is set ON is lower than that in the case where the toner saving mode is set OFF.

Then, a compressing operation is executed for the dithered data (S216). Thereafter, the compressed data are converted into data described in a language (PDL) for operating the printer 20 (S217), and transmitted to the printer 20 (S218). Further, the printer 20 that has received the PDL data forms an image on the recording medium in accordance with the received data.

Next, the toner amounts calculated in S215 are added to the respective total consumed amounts of the toners that have already been stored in the RAM 15 (S219). Then, a value obtained by dividing each of the summed toner amounts by the parameter i is substituted into each of the average consumed toner amounts 308A for each page (S220). Thereafter, the print setting screen 300 is updated (S204).

2.3. Display Control Process of Print Setting Screen Image (See FIG. 4)

Figure 4:
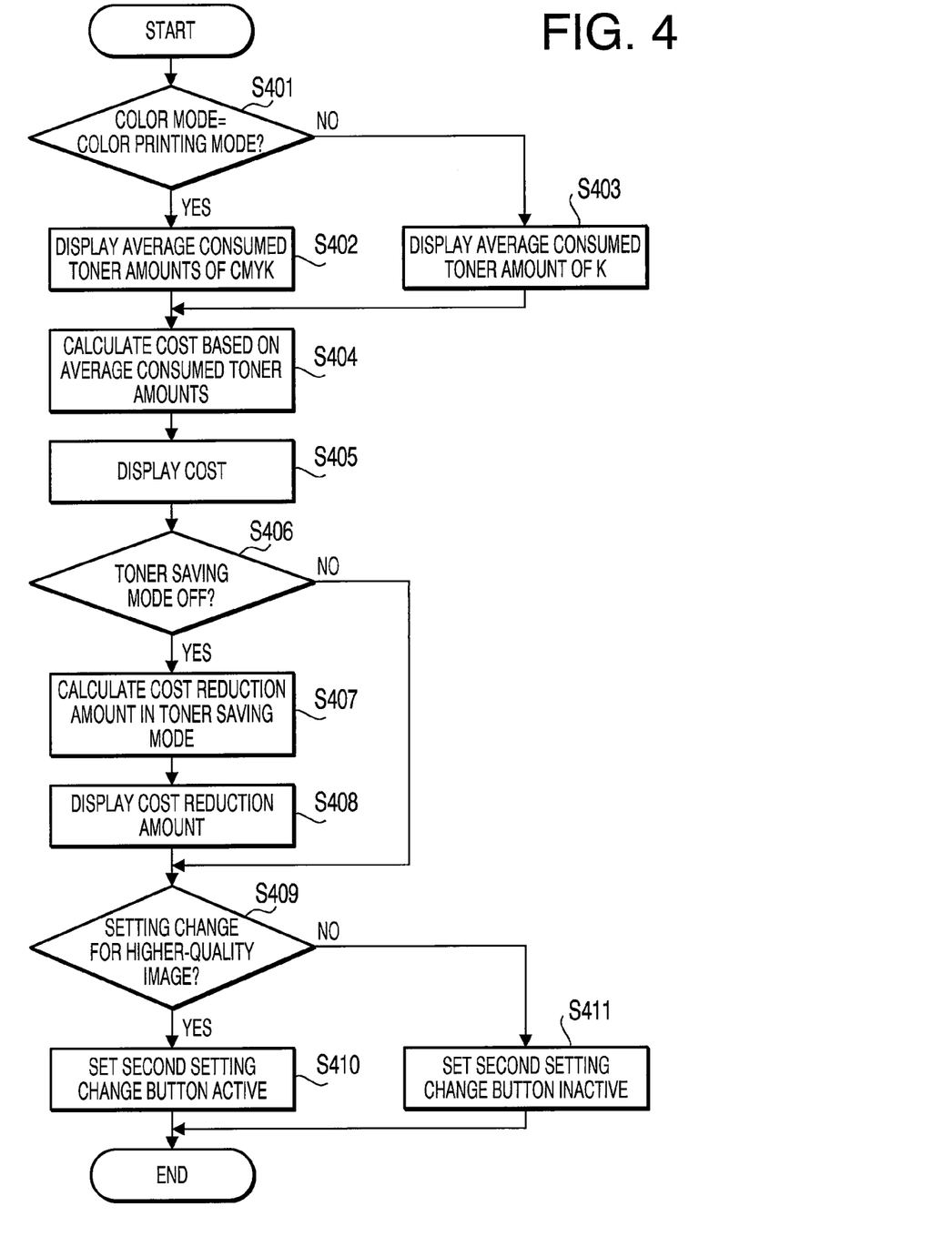
FIG. 4 is a flowchart showing an example of a display control process for the print setting screen in the first embodiment according to one or more aspects of the present invention.

FIG. 4 is a flowchart exemplifying a display control process (S204) of the print setting screen. In the control process, firstly, it is judged whether the color printing mode is selected as the color mode (see FIG. 2), namely, which is selected as the color mode between the color printing mode and monochrome printing mode (S401).

When it is judged that the color printing mode is selected (S401: Yes), there are displayed as the print information 308, the average consumed amount 308A of each of the toners Cyan (C), Magenta (M), Yellow (Y), and Black (K) (S402). Meanwhile, when it is not judged that the color printing mode is selected, namely, when it is judged that the monochrome printing mode is selected (S401: No), the average consumed amount 308A of the toner of Black (K) is displayed (S403).

Next, by multiplying the average consumed amount of each toner by a predetermined coefficient, the average consumed toner cost for each page is calculated (S404). Then, the calculated cost is displayed in the print information 308 (S405), and thereafter it is judged whether the toner saving mode is in the OFF state (S406).

When it is judged that the toner saving mode is in the OFF state (S406: Yes), the savable average consumed toner cost (possible cost reduction amount) 308B is determined (S407), and the determined cost reduction amount 308B is displayed in the print information 308.

In the present embodiment, the cost reduction amount 308B is determined by multiplying the average consumed toner amount by the predetermined coefficient. Specifically, in the toner saving mode, for instance, when the printing operation is executed with 70% of the toner amount in a non-toner-saving mode, a value obtained by multiplying the average consumed toner cost calculated in S404 by 0.3 is given as the cost reduction amount 308B.

Subsequently, it is judged whether such a setting change that the print quality is improved is made, in other words, (a) whether the color mode is changed from the monochrome printing mode to the color printing mode, (b) whether the toner saving mode is changed from the ON state to the OFF state, or (c) whether the printing mode is changed from the fast printing mode to the high-quality image printing mode (S409).

When it is judged that such a setting change that the print quality is improved is made to satisfy at least one of the conditions (a) to (c) (S409: Yes), the second setting change button 305 comes to be selectable (S410). Meanwhile, when it is not judged that such a setting change that the print quality is improved is made, namely, when it is judged that none of the conditions (a) to (c) is satisfied (S409: No), the second setting change button 305 comes to be non-selectable (S411).

2.4. Details about S207 (See FIG. 5)

Figure 5:
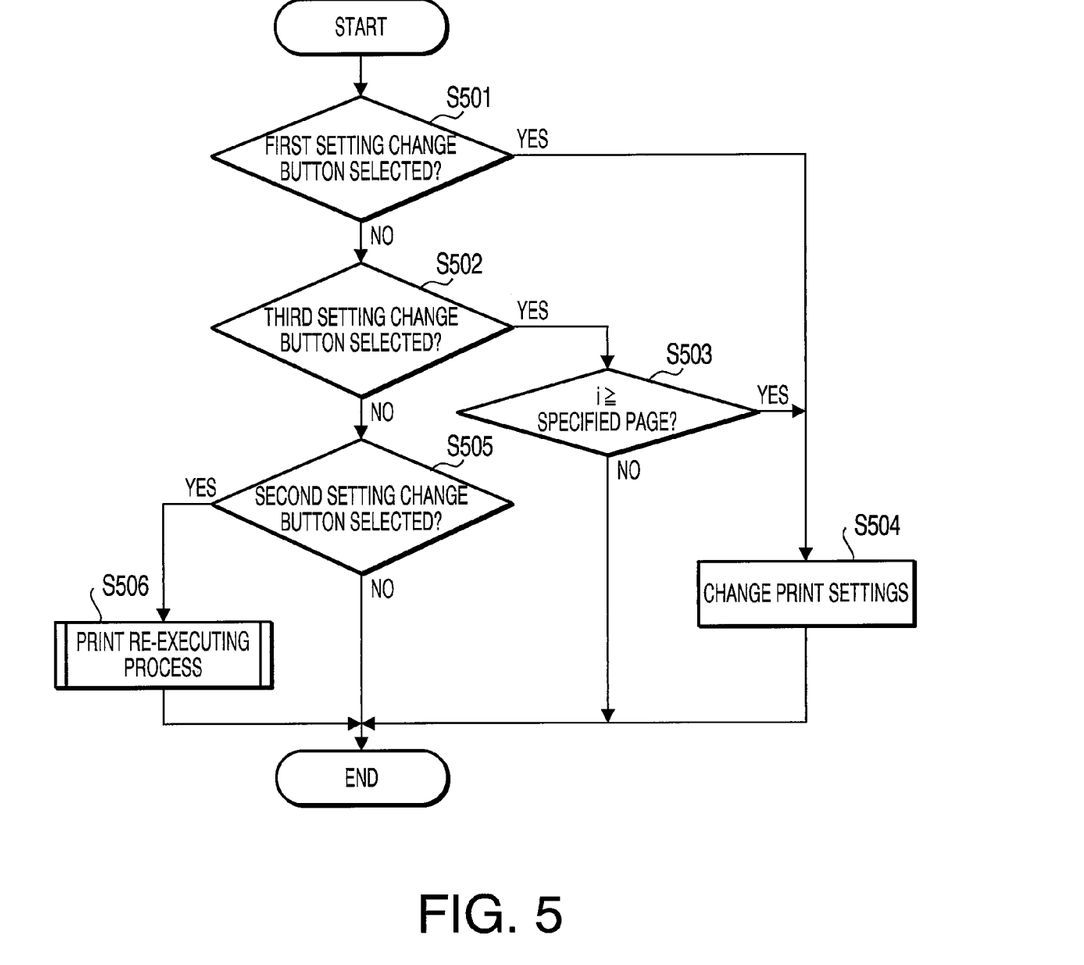
FIG. 5 is a flowchart showing a control process in a step S207 in FIG. 3 in the embodiments according to one or more aspects of the present invention.

FIG. 5 is a flowchart exemplifying a control process for changing the print settings in S207. When the control process shown in FIG. 5 is started up, firstly, it is judged whether the first setting change button 304 is selected (S501). When it is judged that the first setting change button 304 is selected (S501: Yes), the print settings stored in the HDD 16 of the PC 10 are updated with the settings currently displayed on the print setting screen 300 (S504). Thereafter, the control process is terminated, and the present process goes back to the main control process.

At this time, when the current parameter i is "1," since the print data are not transmitted to the printer 20, the print job is performed with the updated print settings from a page number of "1." Meanwhile, when the current parameter i is equal to or more than "2," since the print data of (i−1) pages have already been transmitted to the printer 20, the print job is performed with the updated print settings from a next page to the (i−1)-th page, namely, from the i-th page.

In other words, when the current parameter i is equal to or more than "2," and the first setting change button 304 is selected, the print job is performed with the updated print settings from a subsequent page of a page for which the printing operation is executed at a moment when the print setting change is accepted, or from a page following the subsequent page.

In the meantime, when it is not judged that the first setting change button 304 is selected (S501: No), it is judged whether the third setting change button 306 is selected (S502). When it is judged that the third setting change button 306 is selected (S502: Yes), it is judged whether the current parameter i is equal to or more than the page number (hereinafter, referred to as a "specified page") inputted into the page input portion 307 (S503).

When it is judged that the current parameter i is equal to or more than the specified page (S503: Yes), the print settings stored in the HDD 16 of the PC 10 are updated with the settings currently displayed on the print setting screen 300 (S504). Thereafter, the control process is terminated, and the present process goes back to the main control process.

At this time, since the current parameter i is equal to or more than the specified page, the print data of the specified page to the (i−1)-th page have already been sent to the printer 20. Therefore, the print job cannot be implemented with the updated print settings from the specified page.

In the present embodiment, when the third setting change button 306 is selected, and the current parameter i is equal to or more than the specified page, in the same manner as the case where the first setting change button 304 is selected, the print job may be implemented with the updated print settings from a subsequent page of a page for which the printing operation is performed at a moment when the print setting change is accepted, or from a page following the subsequent page, and the user may be notified of it. Incidentally, the notification is performed with a message or a sound via the display unit 11 or the display panel 22 of the printer 20.

Meanwhile, when it is not judged that the current parameter i is equal to or more than the specified page (S503: No), the control process is terminated, and the present process goes back to the main control process. It is noted that, when the present process goes back to the main control process, the parameter i is sequentially incremented. When the parameter i is equal to or more than the specified page, the print job is performed with the updated print settings from the specified page in S504.

Further, when it is not judged in S502 that the third setting change button 306 is selected (S502: No), it is judged whether the second setting change button 305 is selected (S505). When it is judged that the second setting change button 305 is selected (S505: Yes), a print re-executing process (see FIG. 6) for re-executing the print job from the beginning is executed (S506).

Meanwhile, when it is not judged that the second setting change button 305 is selected (S505: No), the control process is terminated, and the present process goes back to the main control process.

2.5. Print Re-executing Process (See FIG. 6)

Figure 6:
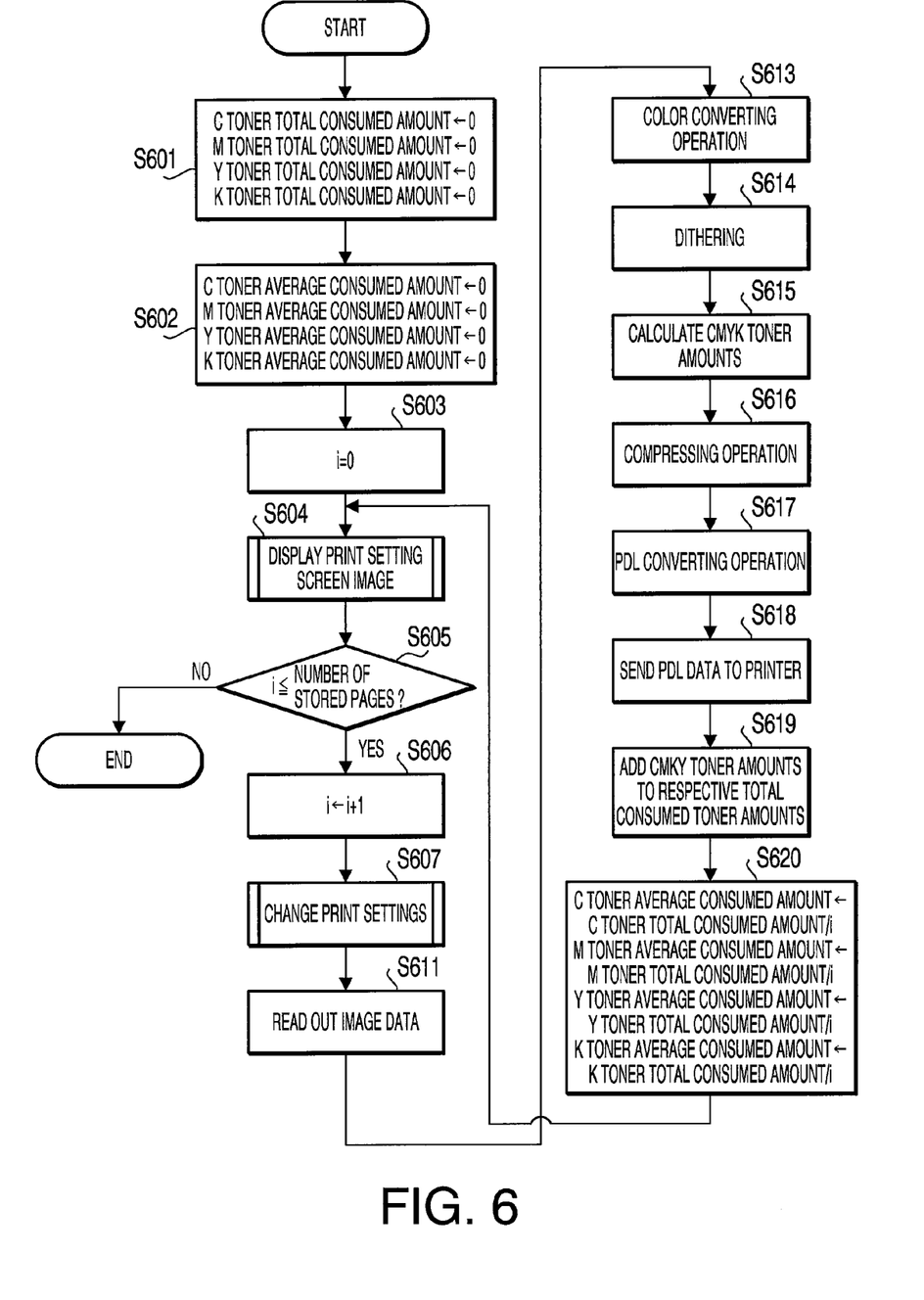
FIG. 6 is a flowchart showing a detailed procedure of a print re-executing process (S506 in FIG. 5) in the embodiments according to one or more aspects of the present invention.

FIG. 6 is a flowchart showing a detailed procedure of a print re-executing process (S506). When the print re-executing process is started up, firstly, an initial value (in the present embodiment, "0") is inputted into the parameter representing total consumed amount of each toner (S601). Then, an initial value (in the present embodiment, "0") is inputted into each of the parameters 308A (see FIG. 2) that represents an average consumed amount of each toner (S602). Thereafter, an initial value (0) is inputted into a parameter i representing a print page number (S603).

Next, the print setting screen 300 is displayed on the display unit 11 (S604), and thereafter it is judged whether the parameter i is equal to or less than the number of pages (hereinafter, referred to as "the number of stored pages") of the image data stored in the RAM 15 (S605). When it is not judged that the parameter i is equal to or less than the number of stored pages (S605: No), the print re-executing process is terminated, and the present process goes back to the main control process. It is noted that S604 is the same process as S204, and therefore detailed explanation thereof will be omitted.

Meanwhile, when it is judged that the parameter i is equal to or less than the number of stored pages (S605: Yes), the PDL data to be sent to the printer 20 can be created through reading out the image data that have already been created in S211 and saved in S212. In this case, the parameter i is then incremented by one (S606), and thereafter the print settings of the printer 20 are updated with the settings accepted on the print setting screen 300 (S607). It is noted that a process in S607 is the same as that in S207, and thus detailed explanation thereof will be omitted.

Subsequently, the image data stored in the RAM 15 are read out (S611). Then, the read-out image data are color-converted in the same manner as S213 (S613). Thereafter, the color-converted data are dithered in the same manner as S214 (S614), and an amount of each toner to be consumed is calculated (S615).

Then, the compressing operation is executed for the dithered data (S616). Thereafter, the compressed data are converted into data described in a language (PDL) for operating the printer 20 (S617), and transmitted to the printer 20 (S618).

Next, the toner amounts calculated in S615 are added to the respective total consumed amounts of the toners that have already been stored in the RAM 15 (S619). Then, a value obtained by dividing each of the summed toner amounts by the parameter i is substituted into each of the average consumed toner amounts 308A for each page (S620). Thereafter, the print setting screen 300 is updated (S604).

3. Features of Print Control System according to Aspects of the Invention

In the present embodiment, even though a print start command is issued, and the print job is in execution, the print settings can be changed on the way of the printing operation by selecting either of the first to third setting change buttons 304 to 306. Therefore, the printer 20 can be made more user-friendly and convenient.

Further, in the present embodiment, when the second setting change button 305 is selected, the print job in execution can be re-executed from the beginning. Therefore, since the user is not required to re-execute the printing operation, the printer 20 can be made further user-friendly and convenient.

In the present embodiment, after the image data are created in the main control process (S211), the created image data are stored in the RAM 15. Thereby, when the second setting change button 305 is selected, the print job can be re-executed from the beginning based on the image data stored in the RAM 15. Hence, the image data are not required to be re-created. Thus, the processing speed, and the user-friendliness and convenience of the printer 20 can be further improved.

Furthermore, in the present embodiment, when the print job in execution is completed, the image data stored in the RAM 15 are deleted (S221). Thus, the RAM 15 can efficiently be used.

In the meantime, supposing that the user changes the print settings into settings for a high-quality image on the way of the printing operation, all images to be printed are desired to be printed with the print settings for the high-quality image.

In this regard, in the present embodiment, when such a setting change that the print quality is improved is made, the second setting change button 305 comes to be selectable. Hence, the printer 20 can be made further user-friendly and convenient.

Additionally, in the present embodiment, the user can input a page number from which the print job is to be executed with the updated print settings. Therefore, the printer 20 can be made further user-friendly and convenient. In addition, it can be prevented that the recording medium such as a printing paper is wastefully consumed.

Further, in the present embodiment, the print setting screen 300 keeps being displayed until the print job in execution is completed. Hence, since the print settings can be changed any number of times at any time in the printing operation, the printer 20 can be made further user-friendly and convenient.

Further, in the present invention, the information related to the toner amount consumed after the print job has been started is displayed for the user. Therefore, the user can easily grasp a state of the consumed toner.

Furthermore, in the present embodiment, the information (in the present embodiment, the savable average consumed toner cost) obtained by comparing the consumed toner amounts before and after the print settings have been changed is displayed. Based on the information, the user can easily acquire information for selecting appropriate print settings.

(Second Embodiment)

In the aforementioned embodiment, when (at which timing) the updated print settings are to be reflected on the print job in execution is entrusted to the user's operations of the first to third setting change button 304 to 306. However, in a second embodiment, when (at which timing) the updated print settings are to be reflected on the print job in execution is automatically judged and applied depending on the settings.

Figure 7:
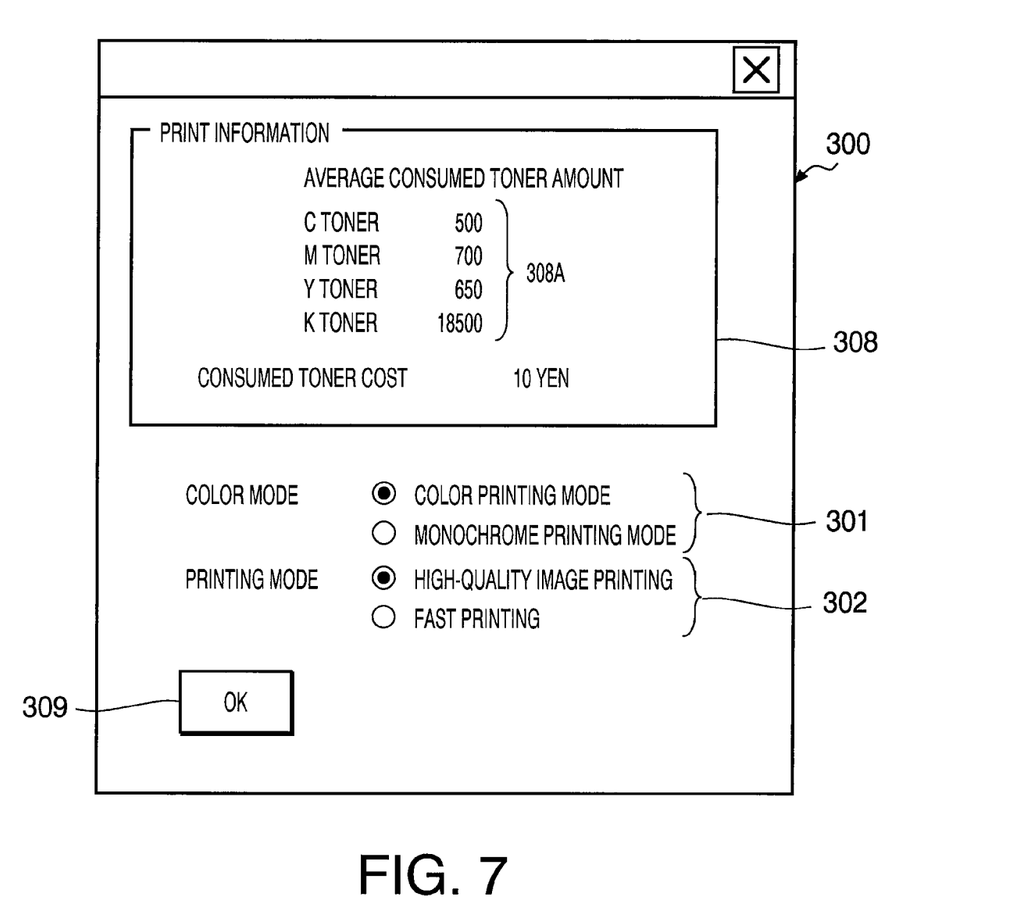
FIG. 7 is an example of a print setting screen in a second embodiment according to one or more aspects of the present invention.
Figure 8:
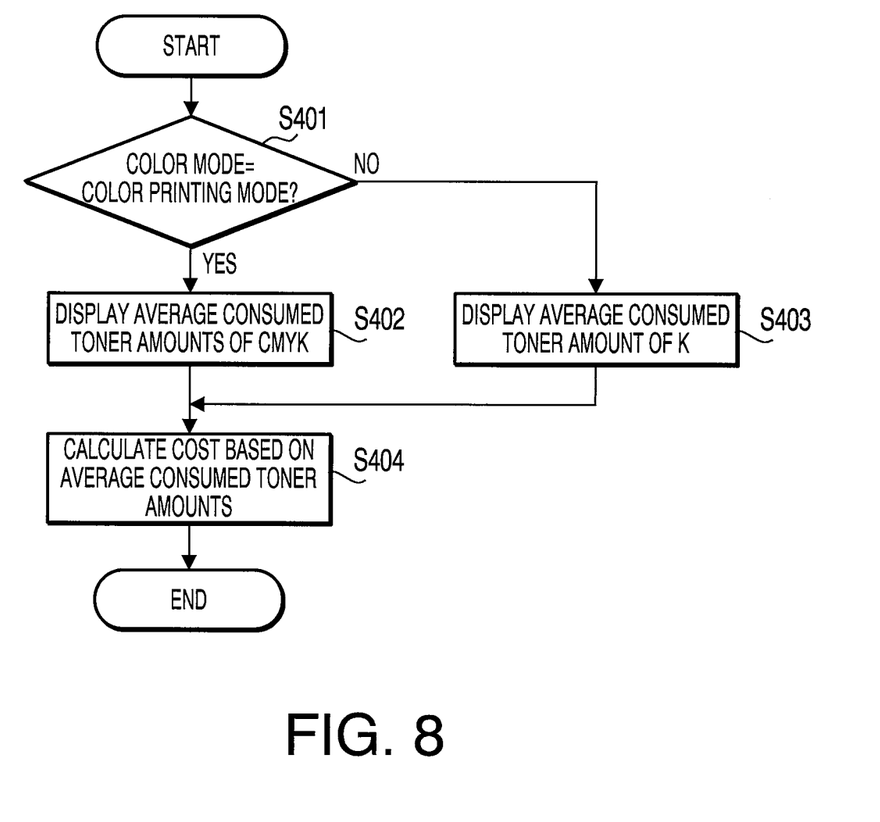
FIG. 8 is a flowchart showing a display control process for the print setting screen in the second embodiment according to one or more aspects of the present invention.
Figure 9:
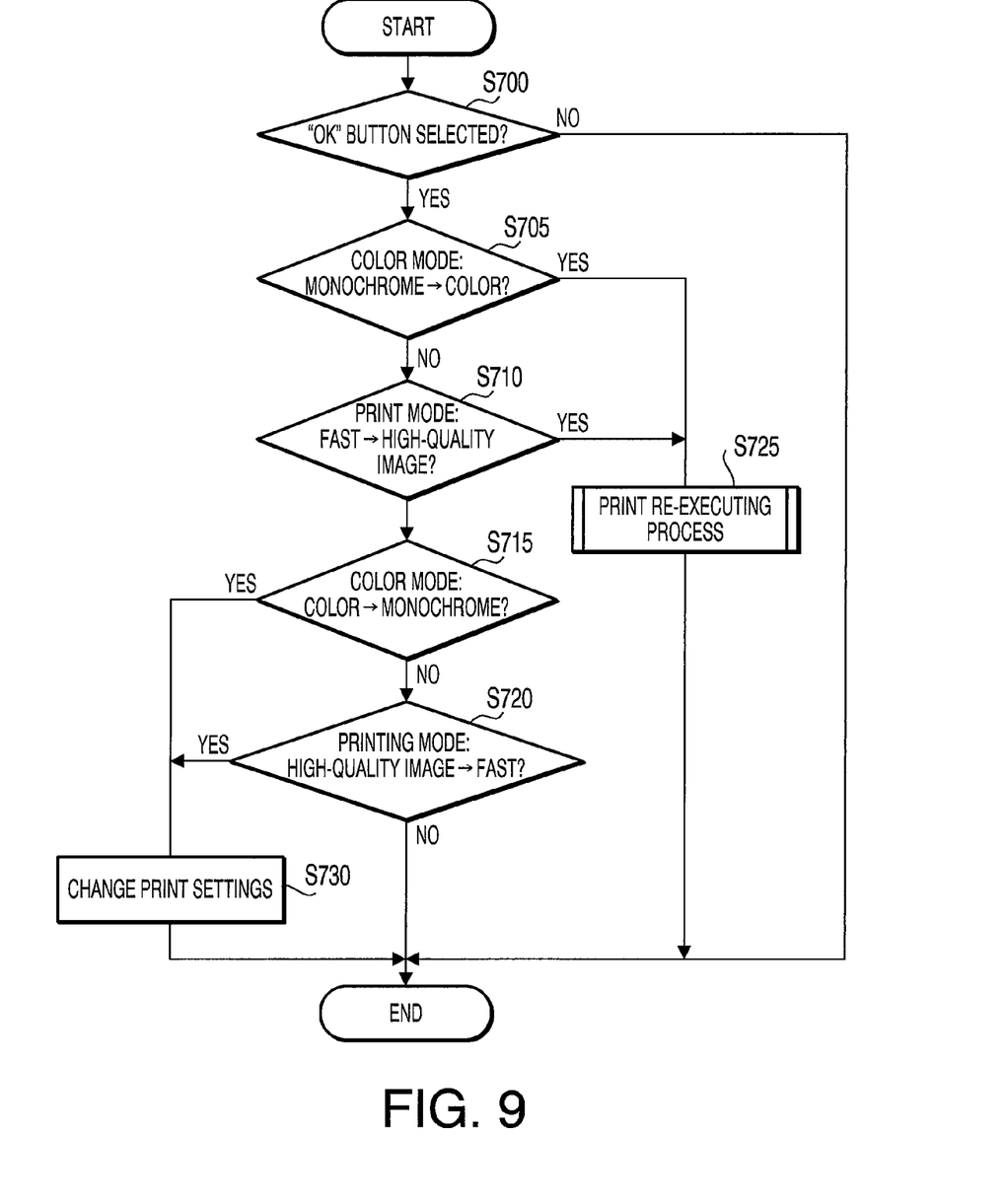
FIG. 9 is a flowchart showing a print setting control process in the second embodiment according to one or more aspects of the present invention.

FIG. 7 is an example of a print setting screen 300 in the present embodiment. FIG. 8 is a flowchart (which corresponds to the flowchart shown in FIG. 4 in the first embodiment) showing a display control process for the print setting screen in the present embodiment. FIG. 9 is a flowchart (which corresponds to the flowchart shown in FIG. 5 in the first embodiment) showing a print setting control process in the present embodiment. It is noted that, since a main control process in the present embodiment is the same as the main control process (see FIG. 3) in the first embodiment, a detailed explanation thereof will be omitted.

1.1. Print Setting Screen Image (See FIG. 7)

In the print setting screen 300 in the present embodiment, as shown in FIG. 7, the first to third setting change buttons 304 to 306 are eliminated. Instead, a "OK" button 309 is provided. The "OK" button 309 is a means for updating the print settings stored in the HDD 16 of the PC 10 with the settings currently displayed on the print setting screen 300.

1.2. Display Control Process of Print Setting Screen Image (See FIG. 7)

A procedure of a display control process for the print setting screen in the present embodiment is, as shown in FIG. 8, equivalent to a procedure of the display control process for the print setting screen in the first embodiment with S406 and the steps following S406 being eliminated.

1.3. Details about S207 in the Present Embodiment (See FIG. 9)

FIG. 9 is a flowchart showing a control process for changing the print settings in S207 in the present embodiment. When the control process shown in FIG. 9 is started, firstly, it is judged whether the "OK" button 309 is selected (S700). When it is not judged that the "OK" button 309 is selected (S700: No), the control process is terminated, and the present process goes back to the main control process.

Meanwhile, when it is judged that the "OK" button 309 is selected (S700: Yes), it is judged whether the color mode is changed from the monochrome printing mode to the color printing mode (S705). When it is judged that the color mode is changed from the monochrome printing mode to the color printing mode (S705: Yes), the same print re-executing process as S506 (see FIGS. 5 and 6) is executed (S725). Then, the control process is terminated, and the present process goes back to the main control process.

Thereby, when the color mode is changed from the monochrome printing mode to the color printing mode, the print job is automatically re-executed from an initial page.

In addition, when it is not judged that the color mode is changed from the monochrome printing mode to the color printing mode (S705: No), it is judged whether the printing mode is changed from the fast printing mode to the high-quality image printing mode (S710). When it is judged that the printing mode is changed from the fast printing mode to the high-quality image printing mode (S710: Yes), the same print re-executing process as S506 (see FIGS. 5 and 6) is executed (S725). Then, the control process is terminated, and the present process goes back to the main control process.

Thereby, when the printing mode is changed from the fast printing mode to the high-quality image printing mode, the print job is automatically re-executed from the initial page.

Meanwhile, when it is not judged that the printing mode is changed from the fast printing mode to the high-quality image printing mode (S710: No), it is judged whether the color mode is changed from the color printing mode to the monochrome printing mode (S715). When it is judged that the color mode is changed from the color printing mode to the monochrome printing mode (S715: Yes), the print settings are changed in the same manner as S504 (see FIG. 5) (S730). Thereafter, the control process is terminated, and the present process goes back to the main control process.

Thereby, when the color mode is changed from the color printing mode to the monochrome printing mode, the print job is automatically executed with the updated print settings from a subsequent page of a page for which the printing operation is executed at a moment when the print setting change has been accepted, or from a page following the subsequent page.

In addition, when it is not judged that the color mode is changed from the color printing mode to the monochrome printing mode (S715: No), it is judged whether the printing mode is changed from the high-quality image printing mode to the fast printing mode (S720). When it is judged that the printing mode is changed from the high-quality image printing mode to the fast printing mode (S720: Yes), the print settings are changed in the same manner as S504 (see FIG. 5) (S730). Then, the control process is terminated, and the present process goes back to the main control process.

Thereby, when the printing mode is changed from the high-quality image printing mode to the fast printing mode, the print job is automatically executed with the updated print settings from a subsequent page of a page for which the printing operation is executed at a moment when the print setting change has been accepted, or from a page following the subsequent page.

Meanwhile, when it is not judged that the printing mode is changed from the high-quality image printing mode to the fast printing mode (S720: No), the control process is terminated, and the present process goes back to the main control process.

2. Features of Print Control System in the Present Embodiment

In the present embodiment, when the color mode is changed from the monochrome printing mode to the color printing mode, or when the printing mode is changed from the fast printing mode to the high-quality image printing mode, the print job in execution is automatically executed from the beginning. Hence, the user is not required to re-execute the printing operation, and therefore the printer 20 can be made further user-friendly and convenient.

Further, in the present embodiment, when the color mode is changed from the color printing mode to the monochrome printing mode, or when the printing mode is changed from the high-quality image printing mode to the fast printing mode, the print job in execution is automatically implemented with the updated print settings from a subsequent page of a page for which the printing operation is executed at a moment when the print setting change is accepted, or from a page following the subsequent page. Thus, the user is not required to perform an operation for issuing the printing command, and therefore the printer 20 can be made further user-friendly and convenient. In addition, it can be prevented that the recording medium such as a printing paper is wastefully consumed.

(Modifications)

In the aforementioned embodiments, all the features according to aspects of the invention are attained by the printer driver (print control program). However, the invention is not limited to such a configuration. For example, the printer 20 may be provided with a means for attaining the features according to aspects of the invention. In this case, in order to execute the print re-executing process shown in FIG. 6, the image data may be stored in an internal memory of the printer 20 such as the RAM 26 and the HDD 27. In addition, a print request command transmitted via the printer driver booted in the PC 10 may be stored in the internal memory, and the stored print request command may be interpreted to create the image data in the print re-executing process. In the latter case, it is possible to save the internal memory of the printer 20.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A print control system, comprising:
 a computer configured to perform data processing;
 a printer, which is connected with the computer, configured to execute a print job transmitted by the computer so as to print an image on a recording medium;
 a display unit configured to display thereon information related to an amount of an image forming substance consumed during execution of the print job; and
 a print control unit configured to:
  control the printer to execute the print job based on print settings,
  cause the printer to function as a setting change unit configured to accept a setting change of the print settings regarding the print job in execution, the setting change being input with reference to the information displayed on the display unit, the setting change unit being further configured to update the print settings based on the accepted setting change while the print job is being executed, and automatically determine, based on a type of the setting change, whether to re-execute the print job from the beginning or to apply the setting change from a subsequent page of a page being printed when the setting change unit accepts the setting change, wherein the determination is automatically made without requiring, at the time of accepting the setting change, user input specifying whether to re-execute the print job from the beginning or to apply the setting change from the subsequent page of the page being printed when the setting change unit accepts the setting change, the automatic determination including:

determining to re-execute the print job from the beginning in response to determining that the type of the setting change is a first type; and determining to apply the setting change from the subsequent page of the page being printed in response to determining that the type of the setting change is a second type.

2. The print control system according to claim 1, further comprising a storage unit configured to store therein image data of the print job, wherein the print control unit controls the printer to re-execute the print job from the beginning based on the image data stored in the storage unit.

3. The print control system according to claim 2, wherein the print control unit further causes the printer to delete the image data stored in the storage unit after the print job in execution is completed.

4. The print control system according to claim 1, wherein the first type of setting change includes changing to printing a higher-quality image than currently formed by the print job in execution.

5. The print control system according to claim 1, wherein the setting change includes a setting change for printing an image at a higher processing speed than a processing speed of the print job in execution.

6. The print control system according to claim 1, wherein the setting change includes a setting change from a color printing mode to a monochrome printing mode with respect to the print job in execution.

7. The print control system according to claim 1, wherein the setting change includes a setting change for saving the image forming substance to be transferred onto the recording medium with respect to the print job in execution.

8. The print control system according to claim 1, wherein at least one of the display unit and another display unit is configured to display thereon a setting screen through which the setting change is inputted, wherein the setting change unit accepts the setting change inputted through the displayed setting screen and updates the print settings based on the accepted setting change while the print job is being executed.

9. The print control system according to claim 8, wherein the setting screen is displayed until the print job in execution is completed.

10. The print control system according to claim 1, wherein the print control unit further causes the printer to function as a comparing unit configured to compare an amount of the image forming substance to be consumed while the print job is executed when the print settings are not updated with an amount of the image forming substance to be consumed while the print job is executed when the print settings are updated, wherein the display unit displays thereon information obtained from the comparison by the comparing unit.

11. A printer configured to be connectable with a computer and to execute a print job transmitted by the computer to print an image on a recording medium, comprising:

a print control unit configured to:

control the printer to execute the print job based on print settings, cause the printer to function as a setting change unit configured to accept a setting change of the print settings regarding the print job in execution, the setting change being input with reference to information displayed on a display unit, the setting change unit being further configured to update the print settings based on the accepted setting change while the print job is being executed, and automatically determine, based on a type of the setting change, whether to re-execute the print job from the beginning or to apply the setting change from a subsequent page of a page being printed when the setting change unit accepts the setting change, wherein the determination is automatically made without requiring, at the time of accepting the setting change, user input specifying whether to re-execute the print job from the beginning or to apply the setting change from the subsequent page of the page being printed when the setting change unit accepts the setting change, the automatic determination including:

determining to re-execute the print job from the beginning in response to determining that the type of the setting change is a first type; and determining to apply the setting change from the subsequent page of the page being printed in response to determining that the type of the setting change is a second type, wherein the information displayed on the display unit relates to an amount of an image forming substance consumed during execution of the print job.

12. A non-transitory computer readable medium storing computer readable instructions that, when executed, cause a printer to:

control execution of a print job based on print settings;

function as a setting change unit configured to accept a setting change of the print settings regarding the print job in execution, the setting change being input with reference to information displayed on a display unit, the setting change unit being further configured to update the print settings based on the accepted setting change while the print job is being executed; and automatically determine, based on a type of the setting change, whether to re-execute the print job from a beginning or to apply the setting change from a subsequent page of a page being printed when the setting change unit accepts the setting change, wherein the determination is automatically made without requiring, at the time of accepting the setting change, user input specifying whether to re-execute the print job from the beginning or to apply the setting change from the subsequent page of the page being printed when the setting change unit accepts the setting change, the automatic determination including:

determining to re-execute the print job from the beginning in response to determining that the type of the setting change is a first type; and determining to apply the setting change from the subsequent page of the page being printed in response to determining that the type of the setting change is a second type.

\* \* \* \* \*